United States Patent Office 3,065,133
Patented Nov. 20, 1962

3,065,133
IMIDAZOLES FOR THE CONTROL OF
HISTOMONIASIS
Serge Tchelitcheff, Vitry-sur-Seine, France, assignor to Societe des Usines Chimiques Rhone-Poulenc, Paris, France, a French body corporate
No Drawing. Filed July 27, 1960, Ser. No. 45,557
Claims priority, application France Sept. 28, 1956
12 Claims. (Cl. 167—53.1)

This invention relates to animal foodstuffs and to compositions suitable for addition to such foodstuffs and drinking water, and to a method of preventing or controlling infections of histomoniasis in animals.

This application is a continuation-in-part of application Serial No. 825,651 filed July 8, 1959, now abandoned, which was itself a continuation-in-part of application Serial No. 685,393 filed September 23, 1957, both now abandoned.

After extensive research and experimentation it has been discovered that nitroimidazoles of the general formula:

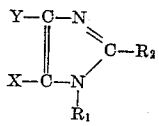

(wherein one of X and Y represents a nitro group and the other a hydrogen atom and $R_1$ and $R_2$ are the same or different and each represents a hydrogen atom or a lower alkyl group) and their acid addition salts are active in the treatment and prevention of histomoniasis.

Histomoniasis (blackhead) is a disease in turkeys caused by a protozoan parasite, *Histomonas meleagradis*. The treatment and prevention of this disease is of utmost importance for the successful rearing of turkeys and recently a great deal of research has been carried out to find compounds useful in the treatment of the disease. The nitroimidazoles of the aforesaid formula have been found in tests to be more efficacious in the treatment and prevention of histomoniasis than compounds previously employed for the same purpose such as 1-ethyl-3-(5-nitro-2-thiazolyl)urea. Imidazoles found to be particularly effective are 1,2-dimethyl-5-nitroimidazole, 2-methyl-4(or 5)-nitroimidazole, 2-ethyl-4(or 5)-nitroimidazole and 4(or 5)-nitroimidazole, the first-mentioned compound being outstanding.

According to a first feature of the present invention there is provided a method of preventing or controlling infections of histomoniasis in animals which comprises administering to said animals small quantities of a nitroimidazole of the general formula just set forth or an acid addition salt thereof.

According to a further feature of the present invention, there is provided as a new composition of matter suitable for the treatment or prevention of histomoniasis, an animal foodstuff comprising as an active ingredient one or more nitroimidazole compounds of the aforesaid formula or acid addition salts thereof. The animal foodstuff, i.e. an organic or mineral substance which is intended to be fed to animals, may be solid or semi-solid. Incorporation of the active ingredient in the foodstuff, which in the case of turkeys may be a commercial starting or growing mash, may be effected by any conventional method such as stirring, tumbling or grinding. In this manner, by altering the ratio of carrier to active ingredient, compositions of varying concentrations can be prepared. The nitroimidazole may be incorporated in the foodstuff in the form of a powder containing it and a solid, physiologically innocuous carrier, e.g. talc, kaolin, calcium phosphate or calcium carbonate or a diatomaceous earth such as kieselguhr, or a mixture thereof.

The amount of active ingredient required in the animal foodstuff for effective prophylactic control of histomoniasis is very low. Good results have been obtained by the administration of a quantity of the active ingredient equal to about 0.001% to 0.1% by weight of the food consumed. Optimum results are usually obtained by the daily administration of a quantity of active ingredient equal to about 0.005% to about 0.05% by weight of the food consumed.

Whilst the concentration of the nitroimidazole compound in the animal foodstuff will generally not exceed 0.1% it is within the scope of the invention to provide animal food concentrates which contain the nitroimidazole compound in higher quantities and which are mixed by the user with further quantities of animal foodstuff to produce a feed having a desired concentration of nitroimidazole compound.

According to a further feature of this invention, there are provided concentrates suitable for addition to animal foodstuffs and drinking water comprising one or more nitroimidazoles of the aforesaid formula or acid addition salts thereof in association with a surface active wetting, dispersing or emulsifying agent, with or without a physiologically innocuous carrier. By the term "physiologically innocuous carrier" as used in this specification and in the appended claims is meant a carrier which is not harmful to the animal organism or oral administration. These concentrates may be dissolved in water or are self-emulsifying with water. Examples of concentrates are (a) mixtures of the active nitroimidazole ingredient with a surface active wetting or dispersing agent, for example, sodium lauryl sulphate or polyoxyethylene (20) sorbitan mono-oleate, (b) powders comprising the active ingredient, a physiologically innocuous carrier, e.g. sucrose, glucose or inorganic salts such as potassium sulphate, and a surface active wetting or dispersing agent, and (c) stable dispersions or solutions obtained by mixing concentrates of types (a) or (b) with water. Preferably these concentrates are added to drinking water to provide a concentration of active ingredient between 0.005% and 0.1% by weight.

The compositions of the invention may contain one or more additional histomonicides, such as furazolidone. Also they may contain substances known to be useful in promoting the growth of turkeys such as, for example, vitamins, antibiotics such as penicillin, penicillin derivatives and tetracyclines, and mineral supplements such as manganese.

The efficacy of 1,2-dimethyl-5-nitroimidazole, 2-methyl-4(or 5)-nitroimidazole, 2-ethyl-4(or 5)-nitroimidazole and 4(or5)-nitroimidazole in the control of histomoniasis has been demonstrated by trials on turkeys. Turkey poults, of mixed sex 14 or 25 days old, were infected by oral dosing with 700–1000 embryonated *Heterakis gallinae* ova. Each of the aforesaid nitroimidazoles was thoroughly mixed in turkey starter mash at a concentration of 0.1% and fed to the poults for 21 days commencing 2 days before infection. At the end of the 21 days all poults had survived. Unmedicated mash was given to the poults for a further ten days and then the poults were killed and autopsy examinations were made for lesions of infectious enterohepatitis. All the poults were found at the post mortem to have no lesions.

Comparative tests using graded concentrations of 1,2-dimethyl-5-nitroimidazole and 1-ethyl-3-(5-nitro-2-thiazolyl)urea included in turkey mash showed that the former compound was substantially 100% effective in combatting histomoniasis at a concentration of 0.012% whereas the latter compound did not give better than 44% protection even when used at a concentration of 0.04%.
The following examples illustrate the invention:

Example I 1 part by weight of 1,2-dimethyl-5-nitroimidazole was mixed with 500 parts by weight of turkey starter mash to form a foodstuff suitable for administration to turkeys to prevent or treat infection by *Histomonas meleagradis*.

Example II

A mixture was prepared containing 22.5% 1,2-dimethyl-5-nitroimidazole, 10% calcium phosphate and 67.5% calcium carbonate, the percentages being by weight. The mixture was ground and incorporated in a suitable foodstuff for turkeys to give a final concentration of about 0.01%. The treated foodstuff was suitable for feeding to turkeys in the treatment and prevention of histomoniasis.

Example III

A composition containing the following ingredients:

| | G. |
|---|---|
| 1,2-dimethyl-5-nitroimidazole | 13 |
| Sucrose | 84 |
| Sodium lauryl sulphate | 3 | was prepared by grinding the ingredients together. The resulting mixture was dissolved in drinking water at a rate of 7 g. per gallon provided a concentration of about 0.02% of active substance in the drinking water.

I claim:
1. An animal foodstuff composition suitable for use in the treatment and prevention of histomoniasis in turkeys and like animals liable to histomoniasis comprising an animal foodstuff and at least 0.001% of at least one compound selected from the class consisting of nitroimidazoles of the general formula:

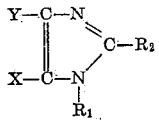

wherein one of X and Y represents a nitro group and the other a hydrogen atom and $R_1$ and $R_2$ are each selected from the class consisting of hydrogen and lower alkyl groups and their acid addition salts.

2. An animal foodstuff composition according to claim 1 in which the concentration of the nitroimidazole ingredient is between 0.001% and 0.1% by weight of the foodstuff.

3. An animal foodstuff composition suitable for use in the treatment and prevention of histomoniasis in turkeys and like animals liable to histomoniasis comprising an animal foodstuff and at least 0.001% of 1,2-dimethyl-5-nitroimidazole.

4. An animal foodstuff composition suitable for use in the treatment and prevention of histomoniasis in turkeys and like animals liable to histomoniasis comprising an animal foodstuff and at least 0.001% of a compound from the group consisting of 2-methyl-4-nitroimidazole and 2-methyl-5-nitroimidazole.

5. An animal foodstuff composition suitable for use in the treatment and prevention of histomoniasis in turkeys and like animals liable to histomoniasis comprising an animal foodstuff and at least 0.001% of a compound from the group consisting of 2-ethyl-4-nitroimidazole and 2-ethyl-5-nitroimidazole.

6. An animal foodstuff composition suitable for use in the treatment and prevention of histomoniasis in turkeys and like animals liable to histomoniasis comprising an animal foodstuff and at least 0.001% of a compound from the group consisting of 4-nitroimidazole and 5-nitroimidazole.

7. A concentrate suitable for addition to animal foodstuff and drinking water for administration to turkeys and like animals liable to histomoniasis comprising a compound selected from the class consisting of nitroimidazoles of the general formula:

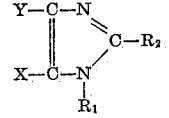

wherein one of X and Y represents a nitro group and the other a hydrogen atom and $R_1$ and $R_2$ are each selected from the class consisting of hydrogen and lower alkyl groups, and their acid addition salts together with a surface active agent the said compound being present in a proportion greater than 0.1%.

8. A concentrate suitable for addition to animal foodstuff and drinking water in turkeys and like animals liable to histomoniasis comprising 1,2-dimethyl-5-nitroimidazole and a surface active agent the said nitroimidazole being present in a proportion greater than 0.1%.

9. A method of preventing and controlling infections of histomoniasis in turkeys and like animals liable to histomoniasis which comprises administering to said animals a compound selected from the class consisting of nitroimidazoles of the general formula:

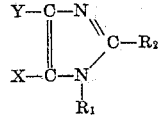

wherein one of X and Y represents a nitro group and the other a hydrogen atom and $R_1$ and $R_2$ are each selected from the class consisting of hydrogen and lower alkyl groups, and their acid addition salts.

10. A method of preventing and controlling infections of histomoniasis in turkeys and like animals liable to histomoniasis which comprises administering to said animals an animal foodstuff composition comprising an animal foodstuff and at least one compound selected from the class consisting of nitroimidazoles of the general formula:

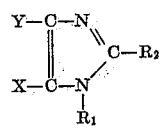

wherein one of X and Y represents a nitro group and the other a hydrogen atom and $R_1$ and $R_2$ are each selected from the class consisting of hydrogen and lower alkyl groups, and their acid addition salts.

11. A method of preventing and controlling infections of histomoniasis in turkeys and like animals liable to histomoniasis which comprises administering to said animals 1,2-dimethyl-5-nitroimidazole.

12. A method of preventing and controlling infections of histomoniasis in turkeys and like animals liable to histomoniasis which comprises administering to said animals an animal foodstuff composition comprising an animal foodstuff and 1,2-dimethyl-5-nitroimidazole.

References Cited in the file of this patent

Chem. Abst., vol. 28, p. 767 (8), 1934.
Chem. Abst., vol. 36, p. 4116 (7) and 4117 (1).